US011887257B2

(12) United States Patent
Baek et al.

(10) Patent No.: US 11,887,257 B2
(45) Date of Patent: Jan. 30, 2024

(54) METHOD AND APPARATUS FOR VIRTUAL TRAINING BASED ON TANGIBLE INTERACTION

(71) Applicant: ELECTRONICS AND TELECOMMUNICATIONS RESEARCH INSTITUTE, Daejeon (KR)

(72) Inventors: Seong Min Baek, Daejeon (KR); Youn-Hee Gil, Daejeon (KR); Cho-Rong Yu, Daejeon (KR); Hee Sook Shin, Daejeon (KR); Sungjin Hong, Incheon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 139 days.

(21) Appl. No.: 17/528,401

(22) Filed: Nov. 17, 2021

(65) Prior Publication Data

US 2022/0157022 A1 May 19, 2022

(30) Foreign Application Priority Data

Nov. 18, 2020 (KR) .................. 10-2020-0154797

(51) Int. Cl.
*G06T 19/00* (2011.01)
*G06T 7/50* (2017.01)
(Continued)

(52) U.S. Cl.
CPC .............. *G06T 19/003* (2013.01); *G06T 7/50* (2017.01); *G06T 7/75* (2017.01); *G09B 9/00* (2013.01);
(Continued)

(58) Field of Classification Search
CPC .. G06T 7/50; G06T 7/521; G06T 7/55; G06T 7/593; G06T 7/596; G06T 7/70–77;
(Continued)

(56) References Cited

U.S. PATENT DOCUMENTS 9,236,032 B2 1/2016 Choi et al.
9,792,689 B2 10/2017 Shiozaki et al.
(Continued)

FOREIGN PATENT DOCUMENTS

JP 2018101124 A 6/2018
KR 10-1401656 B1 6/2014
(Continued)

OTHER PUBLICATIONS

Sărăcin, C.G. and Ioniță, A., Nov. 7, 2020, November. Educational Platform for Simulating the Operation of an Automatic Car Wash Machine. In 2020 International Symposium on Fundamentals of Electrical Engineering (ISFEE) (pp. 1-4). IEEE. (Year: 2020).*
(Continued)

*Primary Examiner* — Diane M Wills
(74) *Attorney, Agent, or Firm* — Rabin & Berdo, P.C.

(57) ABSTRACT

A method and an apparatus for virtual training based on tangible interaction are provided. The apparatus acquires data for virtual training, and acquires a three-dimensional position of a real object based on a depth image and color image of the real object and infrared (IR) data included in the obtained data. Then, virtualization of an overall appearance of a user is performed by extracting a depth from depth information on a user image included in the obtained data and matching the extracted depth with the color information, and depth data and color data for the user obtained according to virtualization of the user is visualized in virtual training content. In addition, the apparatus performs correction on joint information using the joint information and the depth
(Continued)

information included in the obtained data, estimates a posture of the user using the corrected joint information, and estimates a posture of a training tool using the depth information and IR data included in the obtained data.

19 Claims, 18 Drawing Sheets

(51) Int. Cl.
   *G06T 7/73* (2017.01)
   *G09B 9/00* (2006.01)
(52) U.S. Cl.
   CPC .............. *G06T 2207/10048* (2013.01); *G06T 2219/2004* (2013.01)
(58) Field of Classification Search
   CPC .............. G06T 19/003; G06T 19/006; G06T 2207/10048; G06T 2219/2004
   See application file for complete search history.

(56) References Cited

U.S. PATENT DOCUMENTS

| | | | |
|---|---|---|---|
| 10,796,437 B2 | 10/2020 | Kim et al. | |
| 2015/0036879 A1* | 2/2015 | Shiozaki | G06T 7/73 382/103 |
| 2018/0130226 A1* | 5/2018 | Meess | A61F 9/06 |
| 2018/0130376 A1 | 5/2018 | Meess et al. | |
| 2018/0285636 A1* | 10/2018 | Fei | G02B 27/017 |
| 2020/0030651 A1 | 1/2020 | Choi | |
| 2021/0004968 A1* | 1/2021 | Murienne | G06T 19/20 |

FOREIGN PATENT DOCUMENTS

| | | |
|---|---|---|
| KR | 10-1546654 B1 | 8/2015 |
| KR | 10-1636360 B1 | 7/2016 |
| KR | 1020160121379 A | 10/2016 |
| KR | 1020180064907 A | 6/2018 |
| KR | 10-1910529 B1 | 10/2018 |
| KR | 101960929 B1 | 3/2019 |
| KR | 10-1969050 B1 | 4/2019 |
| KR | 10-2016676 B1 | 8/2019 |
| KR | 10-2113997 B1 | 5/2020 |
| KR | 10-2115234 B1 | 5/2020 |
| KR | 1020200117633 A | 10/2020 |

OTHER PUBLICATIONS

Seongmin Baek et al., "VR-Based Job Training System Using Tangible Interactions", Sensors, 21, 6794, pp. 1-16, Oct. 13, 2021.
Korean Office Action dated Feb. 20, 2023, in the counterpart Korean patent application No. 10-2020-0154797.

* cited by examiner

Rag position tracking
(a)

Tracking position/direction of steam gun
(b)

(c)

(a)

(b)

Zigbee Receiver
(c)

(a) Real car model and IR marker position (b) Sampling point and IR marker position extracted from real car (b) Final result by noise joint data (a) Joint noise (a) IR data-marker pixel    (b) Search surrounding pixels in depth image (c) 3D marker position

METHOD AND APPARATUS FOR VIRTUAL TRAINING BASED ON TANGIBLE INTERACTION

CROSS-REFERENCE TO RELATED APPLICATION

This application claims priority to and the benefit of Korean Patent Application No. 10-2020-0154797 filed in the Korean Intellectual Property Office on Nov. 18, 2020, the entire contents of which are incorporated herein by reference.

BACKGROUND OF THE INVENTION

(a) Field of the Invention

The present disclosure relates to a virtual training method, and more particularly, to a virtual training method and apparatus based on tangible interaction.

(b) Description of the Related Art

Since training in a real environment may have various difficulties such as limited physical space, facility management problems, safety accidents, and cost of consumable materials due to repeated training, many studies on virtual training are being conducted.

In this regard, as realistic experience/training, a virtual simulator system that can simulate airplanes, automobiles, farm equipment, etc., a virtual training system such as painting and maintenance of a ship, or a training system in which a cycle pedal is interlocked based on virtual reality (VR) experience and a virtual screen is switched by linking with the pedal speed is being developed.

However, most virtual training/experience services show only a part of the user (e.g., a hand model) or operate in the air, that is, virtual training/experience is performed on a virtual object in an empty space, thereby there is a problem in that tangible interaction by touch is insufficient.

Therefore, based on the conventional virtual training/experience service, it is difficult to perform virtual training in a field (e.g., car washing, etc.) where real contact is important rather than simple selection, and a method for solving this is required.

Considering the problem of lack of tangible interaction, interaction methods such as grabbing virtual objects through force feedback using a glove-type haptic tool have been studied, but there is a problem that it is difficult to use in interactions that require mutual force such as steam car washing.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present disclosure has been made in an effort to provide a virtual training method and apparatus capable of enabling tangible interaction and enhancing realistic effects.

An exemplary embodiment of the present disclosure provides a virtual training method. The method includes: acquiring, by a training apparatus, data for virtual training, and acquiring a three-dimensional position of a real object based on a depth image and color image of the real object and infrared (IR) data included in the obtained data; matching, by the training apparatus, the three-dimensional position of the real object with a position of a virtual object to be applied to a virtual environment; performing, by the training apparatus, a virtualization of an overall appearance of a user by extracting a depth from depth information on a user image included in the obtained data and matching the extracted depth with the color information; visualizing, by the training apparatus, depth data and color data for the user obtained according to virtualization of the user in virtual training content; performing, by the training apparatus, correction on joint information using the joint information and the depth information included in the obtained data, and estimating a posture of the user using the corrected joint information; and estimating, by the training apparatus, a posture of a training tool using the depth information and IR data included in the obtained data.

In an implementation, the performing of correction on joint information may include obtaining final joint positions by applying sample points selected from the depth data for the user obtained according to the virtualization of the user and joint positions obtained from the joint information to a distance probability model, and estimating the posture of the user using the obtained final joint positions.

In an implementation, the performing of correction on joint information may include: selecting sample points selected from the depth data for the user obtained according to the virtualization of the user and obtaining a probability value by applying the sample points and joint positions obtained from the joint information to the distance probability model; selecting a sample point that satisfies a predetermined condition based on a probability value obtained for each sample point; and determining the final joint positions based on an average value of surrounding points of the sample point that satisfies the predetermined condition.

In an implementation, the selecting of a sample point that satisfies a predetermined condition may include: obtaining a final probability value for a sample point based on a probability value obtained based on a square of a distance between a previous joint position and the sample point and a probability value obtained based on a square of a distance between another joint position and the sample point; and selecting a sample point having the largest final probability value from among the final probability values obtained for each sample point.

In an implementation, the determining of the final joint positions may include obtaining an average value of surrounding points around the sample point satisfying the predetermined condition, determining a point having the average value as an initial position of a joint, converting a vector calculated through the initial position and a parent joint position into a normal vector, and determining a final joint position by multiplying the normal vector by a joint length.

In an implementation, the performing of correction on joint information may include, for a fingertip joint and a toe joint among joint information, selecting points in a setting area from among sample points selected from the depth data for the user obtained according to the virtualization of the user, obtaining weights based on a distance and an angle for the selected points, determining a final joint position for the fingertip joint or a final joint position for the toe joint based on the weights, and estimating the posture of the user using the determined final joint positions.

In an implementation, the setting area may be an area in a direction of an elbow-wrist vector and a direction of a knee-ankle vector. Here, in the estimating the posture of the user, an average value of the weights may be determined as the final joint position for the fingertip joint or the final joint position for the toe joint.

In an implementation, the estimating of a posture of a training tool may include matching a center point of IR data obtained from an IR marker attached to the training tool with a center point of the depth information included in the obtained data, determining a position of the IR marker obtained by the IR data based on positions of pixels, which have depth data, extracted from the depth information based on the matched center point, and estimating the posture of the training tool based on the determined position of the IR marker.

In an implementation, the estimating of a posture of a training tool may include: matching the center point of the depth information included in the obtained data with the center point of the IR data obtained from the IR marker attached to the training tool; extracting pixels having depth data in each direction above, below, left, and right from the depth information based on the matched center point; converting the positions of the extracted pixels into three-dimensional positions; determining a three-dimensional position of a pixel having an average value of the three-dimensional positions of the extracted pixels as a position of the IR marker; and estimating the posture of the training tool based on the determined position of the IR marker.

In an implementation, the extracting of pixels having depth data in each direction may include searching for pixels having depth data in each direction up, down, left, and right from the depth information, and ending the searching when a number of searched pixels is a set number.

In an implementation, the virtual training may be virtual steam car wash training, the real object may be a car, the virtual object may be a virtual car, the training tool may include a rag and a steam gun, and the obtained data may include pressure data obtained from a pressure sensor inserted into the rag and button operation data obtained from a button sensor included in the steam gun.

In an implementation, the method may further include, after the estimating of a posture of a training tool, estimating force applied to the rag based on the pressure data, confirming injection timing of the steam gun based on the button operation data, and evaluating performance of the virtual steam car wash training based on the estimated force, the injection timing, and the estimated user posture of the training tool.

Another embodiment of the present disclosure provides an apparatus for virtual training. The apparatus includes: an interface device configured to receive data for virtual training from a multi-sensor; and a processor configured to provide virtual training content based on the data input through the interface device, wherein the processor is configured to perform operations by: acquiring, through the interface device, data for virtual training, and acquiring a three-dimensional position of a real object based on a depth image and color image of the real object and infrared (IR) data included in the obtained data; matching the three-dimensional position of the real object with a position of a virtual object to be applied to a virtual environment; performing virtualization of an overall appearance of a user by extracting a depth from depth information on a user image included in the obtained data and matching the extracted depth with the color information; visualizing depth data and color data for the user obtained according to virtualization of the user in virtual training content; performing correction on joint information using the joint information and the depth information included in the obtained data, and estimating a posture of the user using the corrected joint information; and estimating a posture of a training tool using the depth information and IR data included in the obtained data.

In an implementation, when performing the operation of correction based on joint information, the processor may be configured to obtain final joint positions by applying sample points selected from the depth data for the user obtained according to the virtualization of the user and joint positions obtained from the joint information to a distance probability model, and estimate the posture of the user using the obtained final joint positions.

In an implementation, when performing the operation of correction based on joint information, the processor may be configured to perform operations by: selecting sample points from the depth data for the user obtained according to the virtualization of the user and obtaining probability values by applying the sample points and joint positions obtained from the joint information to the distance probability model; selecting a sample point that satisfies a predetermined condition based on a probability value obtained for each sample point; and determining the final joint positions based on an average value of surrounding points of the sample point that satisfies the predetermined condition.

In an implementation, when performing the operation of selecting a sample point that satisfies a predetermined condition, the processor may be configured to perform operations by: obtaining a final probability value for a sample point based on a probability value obtained based on a square of a distance between a previous joint position and the sample point and a probability value obtained based on a square of a distance between another joint position and the sample point; and selecting a sample point having the largest final probability value from among the final probability values obtained for each sample point.

In an implementation, when performing the operation of determining the final joint positions, the processor may be configured to perform an operation by obtaining an average value of surrounding points around the sample point satisfying the predetermined condition, determining a point having the average value as an initial position of a joint, converting a vector calculated through the initial position and a parent joint position into a normal vector, and determining a final joint position by multiplying the normal vector by a joint length.

In an implementation, when performing the operation of correction based on joint information, the processor may be configured to perform an operation by, for a fingertip joint and a toe joint among joint information, selecting points in a setting area from among sample points selected from the depth data for the user obtained according to the virtualization of the user, obtaining weights based on a distance and an angle for the selected points, determining a final joint position for the fingertip joint or a final joint position for the toe joint based on the weights, and estimating the posture of the user using the determined final joint positions.

In an implementation, when performing the operation of estimating a posture of a training tool, the processor may be configured to perform an operation by, for a training tool with a center point of the depth information included in the obtained data, determining a position of the IR marker obtained by the IR data based on positions of pixels, which have depth data, extracted from the depth information based on the matched center point, and estimating the posture of the training tool based on the determined position of the IR marker. In an implementation, when performing the operation of estimating a posture of a training tool, the processor may be configured to perform operations by: matching the center point of the depth information included in the obtained data with the center point of the IR data obtained from the IR marker attached to the training tool; extracting pixels having depth data in each direction above, below, left, and right from the depth information based on the matched center point; converting the positions of the extracted pixels into three-dimensional positions; determining a three-dimensional position of a pixel having an average value of the three-dimensional positions of the extracted pixels as a position of the IR marker; and estimating the posture of the training tool based on the determined position of the IR marker.

In an implementation, the virtual training may be virtual steam car wash training, the real object may be a car, the virtual object may be a virtual car, the training tool may include a rag and a steam gun, and the obtained data may include pressure data obtained from a pressure sensor inserted into the rag and button operation data obtained from a button sensor included in the steam gun. Here, after performing the operation of estimating a posture of a training tool, the processor may be further configured to perform an operation by, estimating force applied to the rag based on the pressure data, confirming injection timing of the steam gun based on the button operation data, and evaluating performance of the virtual steam car wash training based on the estimated force, the injection timing, and the estimated user posture of the training tool.

DETAILED DESCRIPTION OF THE EMBODIMENTS

Figure 1:
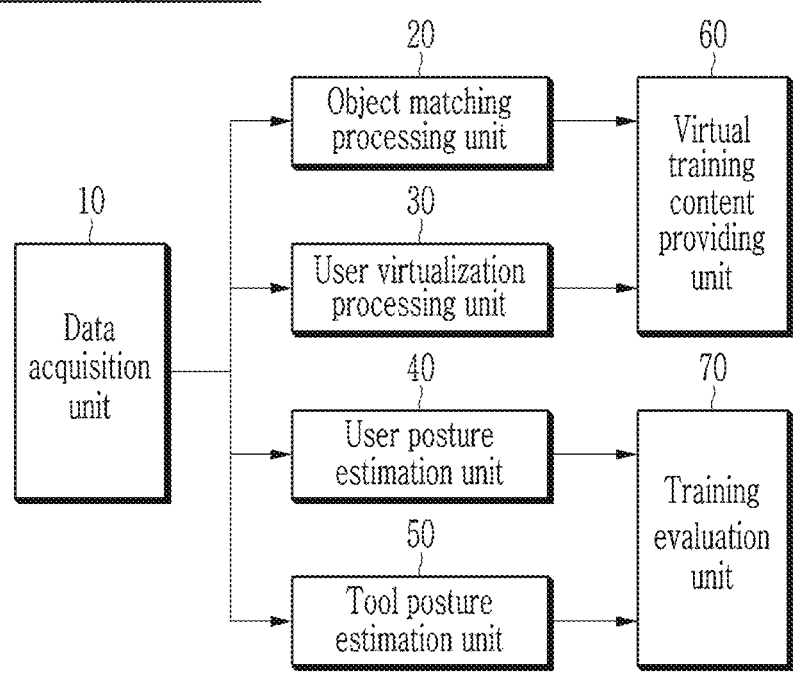
FIG. 1 is a diagram illustrating a structure of a virtual training apparatus according to an embodiment of the present disclosure.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements.

The expressions described in the singular may be interpreted as singular or plural unless an explicit expression such as "one", "single", and the like is used. In addition, terms including ordinal numbers such as "first" and "second" used in embodiments of the present disclosure may be used to describe components, but the components should not be limited by the terms. The terms are only used to distinguish one component from another. For example, without departing from the scope of the present disclosure, a first component may be referred to as a second component, and similarly, the second component may be referred to as the first component.

Hereinafter, a method and an apparatus for virtual training based on tangible interaction according to an embodiment of the present disclosure will be described with reference to the drawings.

In an embodiment of the present disclosure, a user's shape and posture are estimated from a multi-sensor for realistic virtual training, a posture of a tool required for virtual training and/or a pressure applied to the tool is tracked, while a real object is linked with a virtual object in virtual environments and real user's appearance is virtualized, not just a part of the user (e.g., hand). To this end, the real object and the virtual object are matched, and the three-dimensional (3D) points obtained from the real object are matched with the 3D points of the virtual object for coordinate system matching. By matching the coordinate system of the real object with the coordinate system of the virtual object in the virtual environment, if a user interacts with the virtual object when a virtual training service is provided, the user may touch the real object so that a real feeling can be obtained.

In the following embodiments, a virtual training method and apparatus according to an embodiment of the present disclosure will be described by taking virtual steam car washing training as an example of virtual training, but the present disclosure is not limited to virtual steam washing training.

Figure 2:
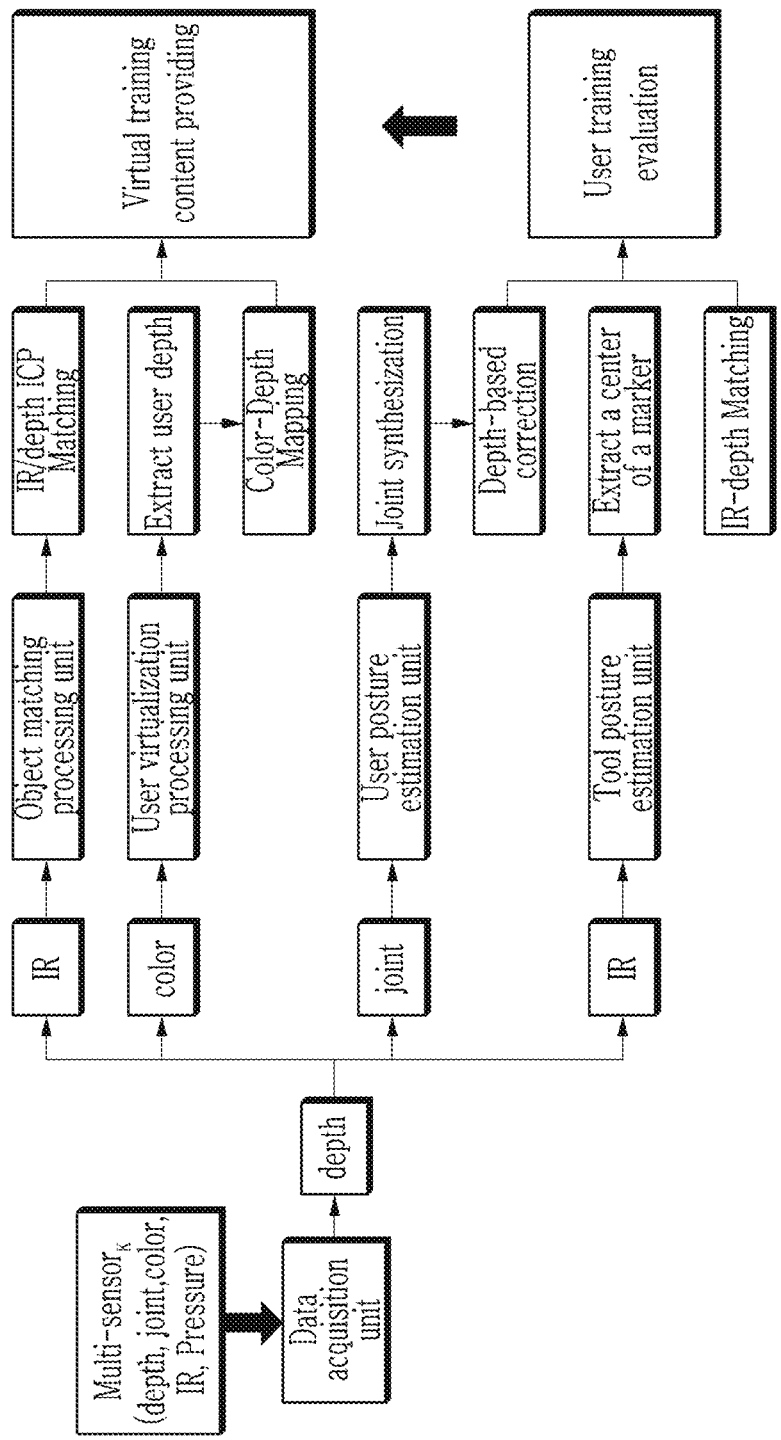
FIG. 2 is a diagram illustrating operations of components constituting a virtual training apparatus according to an embodiment of the present disclosure.

FIG. 1 is a diagram illustrating the structure of a virtual training apparatus according to an embodiment of the present disclosure, and FIG. 2 is a diagram illustrating operations of components constituting the virtual training apparatus according to an embodiment of the present disclosure.

As shown in FIG. 1, the virtual training apparatus 1 according to an embodiment of the present disclosure includes a data acquisition unit 10, an object matching processing unit 20, a user virtualization processing unit 30, a user posture estimation unit 40, a tool posture estimation unit 50, a virtual training content providing unit 60, and a training evaluation unit 70.

The data acquisition unit 10 is configured to acquire various data for virtual training. As shown in FIG. 2, the data acquisition unit 10 acquires sensor data from a multi-sensor, for example, a sensor that detect depth, color, joint, pressure, infrared (IR) data, and the like. The multi-sensor includes RGB cameras, IR sensors, audio sensors (e.g., microphone arrays), pressure sensors, and the like. By a multi-sensor, the depth image (depth information) along with the color image (color information) of the measurement object (e.g., a real object, a user, a training tool, etc.) can be obtained in real time, and position data on main skeletons that make up a human body and information (joint information) of body parts corresponding to the skeleton based on corresponding joint points may be obtained. In addition, IR data may be obtained by an IR sensor. Infrared rays reflected by an IR marker mounted on a measurement object may be received by the IR sensor to acquire corresponding IR data. A pressure sensor can be mounted on a tool for virtual training to measure the pressure applied to the tool. Such multi-sensor may be a Microsoft Kinect sensor.

An embodiment of the present disclosure provides virtual training, for example, virtual steam car washing training.

Figure 3:
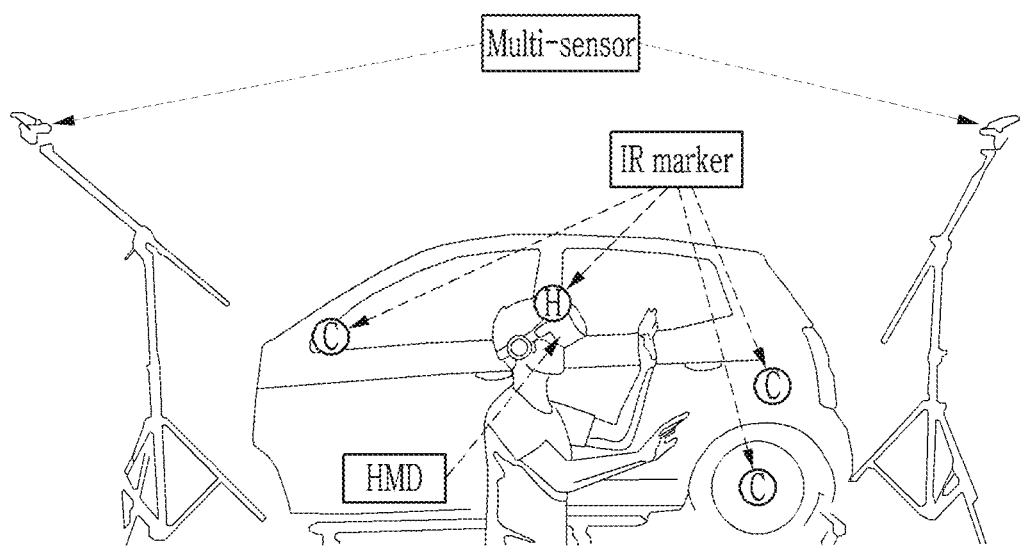
FIG. 3 is a diagram illustrating an example of installation of a multi-sensor for virtual steam car washing training according to an embodiment of the present disclosure.
Figure 4A:
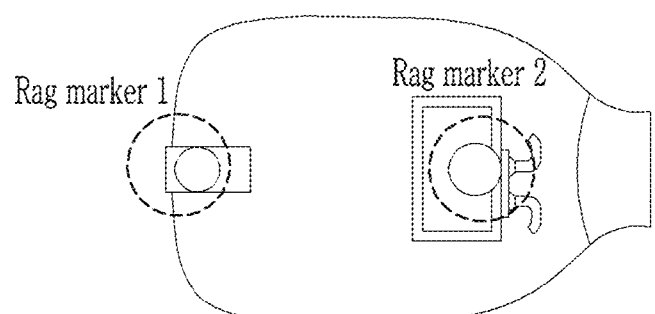
FIG. 4A and FIG. 4B are diagrams illustrating an example in which an infrared (IR) marker and a sensor are installed in a training tool for virtual steam car washing training according to an embodiment of the present disclosure.
Figure 4A:
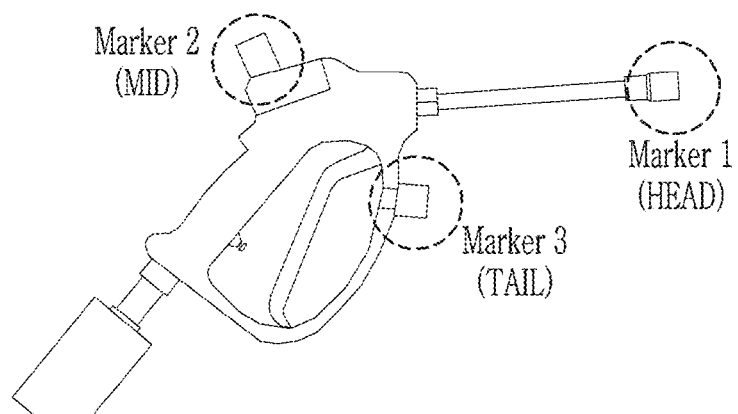
Figure 4A:
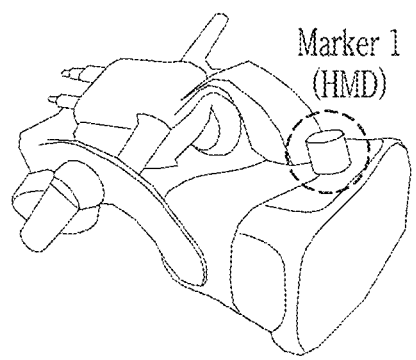
Figure 4B:
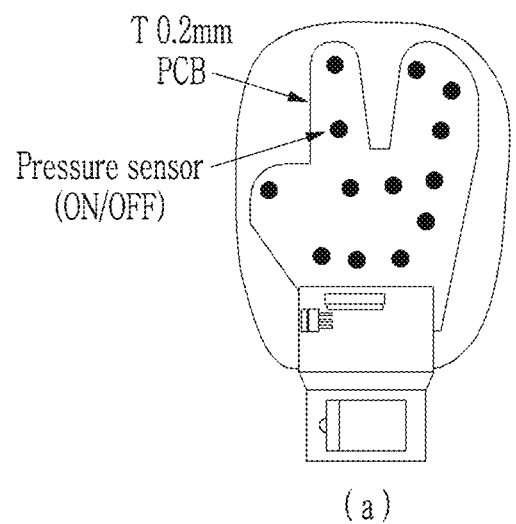
Figure 4B:
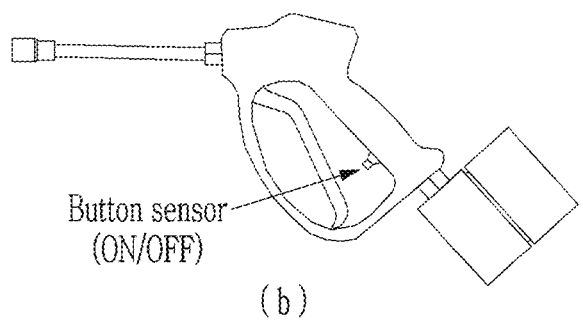
Figure 4B:
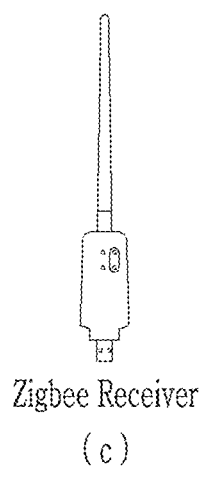
Figure 5:
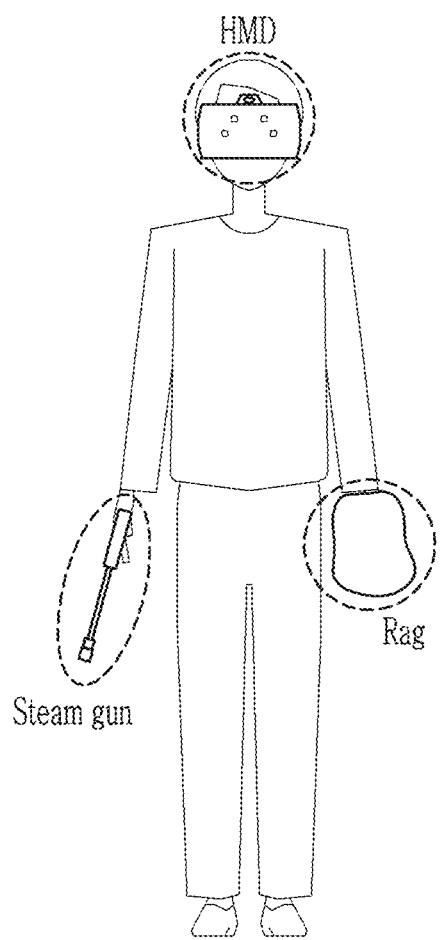
FIG. 5 is a diagram illustrating an example of a user using a tool for virtual steam car washing training according to an embodiment of the present disclosure.

FIG. 3 is a diagram illustrating an example of installation of a multi-sensor for virtual steam car washing training according to an embodiment of the present disclosure. FIG. 4A and FIG. 4B are diagrams illustrating an example in which an IR marker and a sensor are installed in a training tool for virtual steam car washing training according to an embodiment of the present disclosure. FIG. 5 is a diagram illustrating an example of a user using a tool for virtual steam car washing training according to an embodiment of the present disclosure.

In an embodiment of the present disclosure, as illustrated in FIG. 3, a plurality (e.g., three) IR markers C may be attached to a real object that is a real car or a car model. A user wears a head mounted display (HMD), and a multi-sensor can be installed around the real object, such as the car model (or a real car). For example, RGB cameras and IR sensors are installed around a real object and a user so that they can shoot the real object and the user.

The IR marker is also installed on the user's HMD. IR data obtained by the IR marker (H) installed on the user's HMD is used as the user's reference position in the virtual space. Based on this reference position, user data in the world coordinate system may be matched to a position in the virtual coordinate system.

IR markers are used to recognize the posture of the tools required for virtual training. IR markers are attached to the required training tools, and the 3D position is estimated from the image (IR data) input from the IR sensor. Training tools required for virtual steam car washing training include, but are not limited to, a steam gun, a cleaning rag, and the like. The existing virtual experience has a problem in that it is difficult to use realistic training tools because a controller is held in a hand. In an embodiment of the present disclosure, a situation like actual training is created by using a training tool (steam gun, rag, etc.) used in actual training.

As illustrated in FIG. 4A, an IR marker is attached to a rag, which is a training tool for virtual steam car washing training ((a) of FIG. 4A), an IR marker is attached to a steam gun, which is a training tool ((a) of FIG. 4A), and further, an IR marker is attached to the user's HMD ((c) of FIG. 4A). Here, a plurality of IR markers can be attached to calculate the direction. For example, for calculating the direction of the steam gun, IR markers may be attached at at least three places, respectively, and each IR marker may have a different length. In addition, as illustrated in FIG. 4B, a pressure sensor is inserted into the rag to measure the force applied to the rag ((a) of FIG. 4B). In addition, a button sensor may be installed on the trigger part of the steam gun to know when to spray the steam ((b) of FIG. 4B). In this case, signals from the sensors may be received using a Zigbee receiver ((c) of FIG. 4B).

For virtual steam car washing training, as illustrated in FIG. 5, a user may wear the HMD on their head, hold the steam gun in their right hand, and wear the rag in their left hand.

Meanwhile, in order to classify the IR markers attached to various training tools, the IR markers may be divided based on the position of the joint. For example, as in FIG. 5, in the case of virtual steam car washing training, since the HMD is worn on the head, the steam gun is held in the right hand, and the rag is worn in the left hand, the IR markers can be classified based on the hand joint positions and the head joint positions. The hand direction can be selected depending on the option.

In this environment, various types of data (color data, depth data, IR data, pressure, button operation time, etc.) for virtual training are obtained by a multi-sensor, and the obtained various data is provided to the object matching processing unit 20, the user virtualization processing unit 30, the user posture estimating unit 40, and the tool posture estimating unit 50.

Meanwhile, the object matching processing unit 20 is configured to match a real object and a virtual object. In the existing virtual experience/training apparatus, most user actions are performed in the air, and only the hand model, which is a part of the user, is shown. Accordingly, in an embodiment of the present disclosure, by matching the real object and the virtual object to the coordinate system in the virtual environment based on user data and tool data for immersive experience, the tangible interaction part is augmented.

For virtual steam car washing training, the object matching processing unit 20 utilizes IR data obtained from a plurality of IR markers attached to a real object (that is, a car) as shown in FIG. 3 and a depth point obtained from an image of a real car to calculate the 3D position of the real object.

Figure 6:
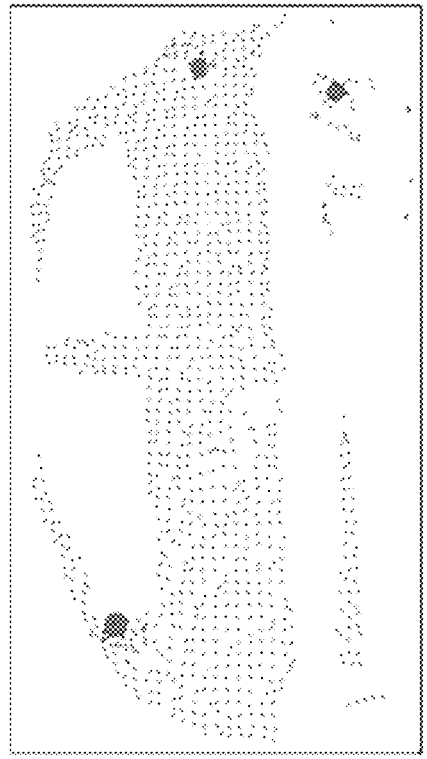
FIG. 6 is a diagram illustrating an example of position calculation using an IR marker according to an embodiment of the present disclosure.
Figure 6:
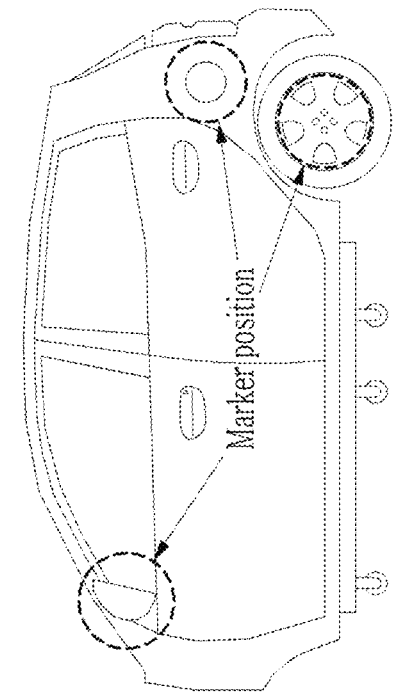

FIG. 6 is a diagram illustrating an example of position calculation using an IR marker according to an embodiment of the present disclosure.

For example, as shown in (a) of FIG. 6, in a state where IR markers are attached to a real object, which is a real car, at three positions, respectively, depth information about the real object and IR data by the IR markers are obtained. As shown in (b) of FIG. 6, sampling points can be extracted from depth information about the real object, the positions of the IR markers are calculated based on the IR data, and a three-dimensional position with respect to the real object is calculated based on the extracted sampling point and the positions of the IR markers.

The object matching processing unit 20 matches the position of the real object with the position of a virtual object (e.g., a virtual car model) to be applied to the virtual environment. For example, matching may be performed by applying an iterative closest points (ICP) technique. Here, the camera position in the real world becomes the world coordinate system, and future position calculations in the virtual environment are converted based on the world coordinate system of the real world.

Meanwhile, the user virtualization processing unit 30 is configured to perform user virtualization processing using color information and depth information transmitted from the data acquisition unit 10. As shown in FIG. 2, the user virtualization processing unit 30 extracts depth data from depth information on an image of a user, and performs user virtualization by matching the extracted depth data and the color information. According to this user virtualization, color data and depth data for the user's image are obtained, and by visualizing the depth data and color data for the user in the virtual training content, the user can see his/her own appearance. The user virtualization processing unit 30 sets the user's reference position based on the IR data obtained by the IR markers attached to the HMD, and performs user virtualization based on the user's reference position. Through this, it is possible to adjust the user's position in the virtual space.

User data including the depth data and the color data about the user's image means data from which background data and noise have been removed, and the number of pieces of data is reduced through a volume sampling technique for real-time visualization to be provided to the virtual training content providing unit 60. That is, by generating sampling points for the depth data and color data of the user data, only the sampling points may be provided to the virtual training content providing unit 60.

The virtual training content providing unit 60 is configured to provide content for virtual training, by using the result of matching the position of the real object with the position of the virtual object to be applied to the virtual environment from the object matching processing unit 20 and the user data (the depth data and color data for the user) virtualized by the user virtualization processing unit 30.

Figure 7:
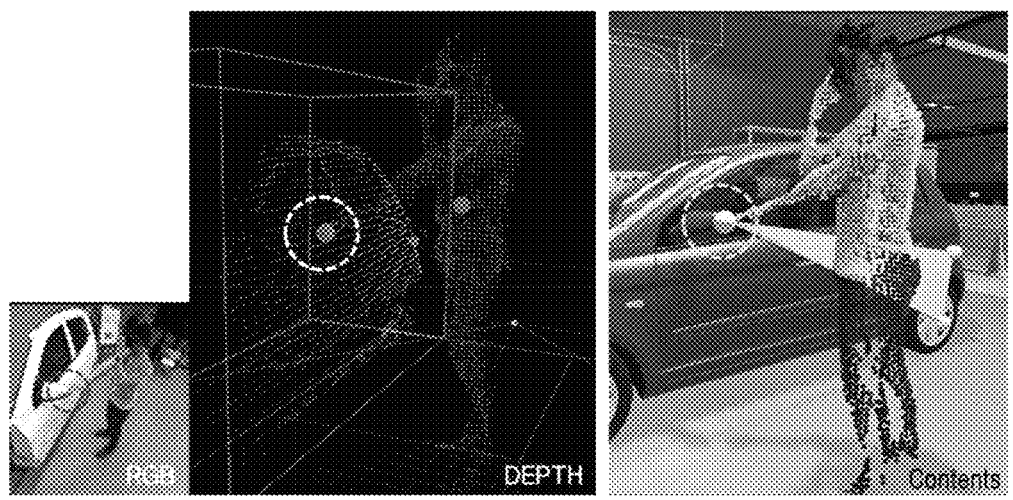
FIG. 7 is an exemplary diagram illustrating content provided in a virtual space according to an embodiment of the present disclosure.

FIG. 7 is an exemplary diagram illustrating content provided in a virtual space according to an embodiment of the present disclosure.

For example, as in FIG. 7, user virtualization processing is performed using an actual RGB image and a depth image taken by the user, and the depth data and color data for the user obtained according to the user virtualization are visualized in the virtual training contents. That is, while the virtual training content is provided through the HMD worn by the user, the virtual object whose position is matched with the real object is visualized in the virtual space, and the user is visualized. In this case, while the user is visualized based on the sampling points, the entire appearance of the user, not a part of the user, is visualized. Accordingly, the user can see his/her own appearance and perform virtual training using training tools (steam gun, rag, etc.).

Meanwhile, the depth data (sampling points) for the user generated by the user virtualization processing unit 30 may be provided to the user posture estimation unit 40 and used for user posture estimation.

The user posture estimating unit 40 is configured to estimate the user's posture. The user posture estimation unit 40 may estimate the user posture using the joint information and the depth information transmitted from the data acquisition unit 10 and the depth data for the user transmitted from the user virtualization processing unit 30. The joint information provides position and rotation data for the main skeletons of the human body, for example, 25 parts (e.g., a head joint (HEAD), a shoulder joint (SHOULDER), a body center joint (CENTER), a vertebral joint (SPINE), a hip joint (HIP), an elbow joint (ELBOW), a wrist joint (WRIST), a fingertip joint (HAND), a knee joint (KNEE), an ankle joint (ANKLE), a toe joint (FOOT), etc.). The joints included in the joint information may be classified into parent joints and child joints. The parent joint is a joint that is not affected by the position or direction of the child joint, and the child joint is a joint that is affected by the direction of the parent joint. Skeleton information may be obtained based on such joint information.

Conventionally, a convolutional neural network (CNN) technique is applied to estimate joint positions, but in this case, good performance is shown only when the posture is front and well visible, and noise occurs severely when a user moves sideways or a part of the user is obscured. Also, because the calculation process is complicated, a time delay occurs, and the joint data and the depth data do not match each other. Even if occlusion is minimized using several Kinect sensors, these noises cause noise in the integrated results of the sensors.

Figure 8:
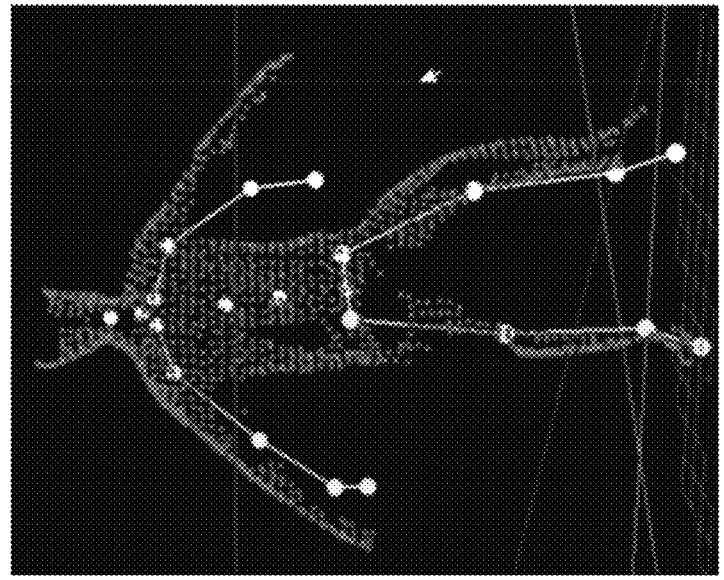
FIG. 8 is an exemplary diagram illustrating joint noise.
Figure 8:
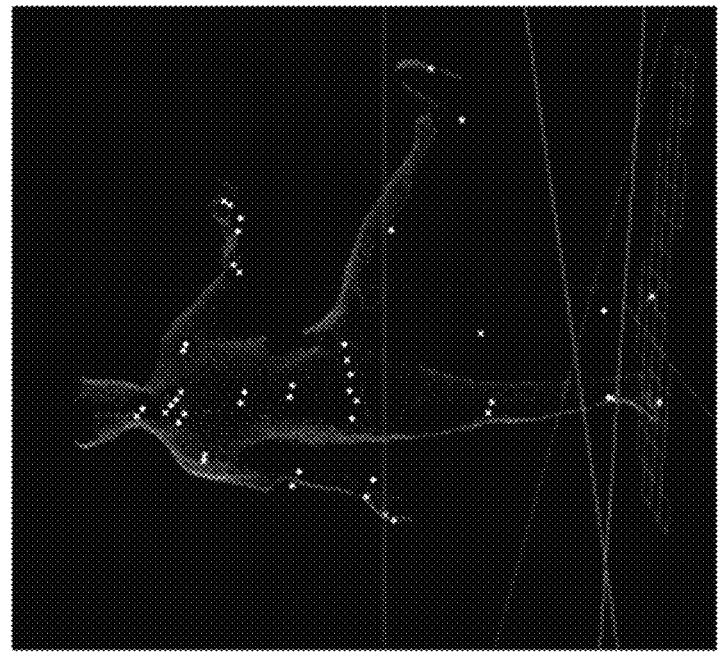

FIG. 8 is an exemplary diagram illustrating joint noise.

For example, when a Kinect sensor is used as a multi-sensor, joint noise is generated as shown in (a) of FIG. 8 according to the Kinect direction and user posture measured by the Kinect sensor. If the joint information including the joint noise is matched with the three-dimensional sampling point of the user depth data, and the exact joint position is not estimated in the arms and legs as shown in (b) of FIG. 8.

In an embodiment of the present disclosure, in order to accurately acquire a user posture essential for virtual training, correction of joint information obtained by a multi-sensor is performed. That is, the posture is corrected and estimated using joint information obtained by a multi-sensor and depth data. Since the depth data reflects the actual position, there is an advantage that a more accurate position can be obtained.

The length of the joint is changed while estimating the joint position in every frame by a multi-sensor (e.g., a Kinect sensor). In an embodiment of the present disclosure, the joint length is fixed in order to estimate an accurate posture. To this end, anthropometric data is used to calculate the user's joint distance. In an embodiment of the present disclosure, the anthropometric data uses average values for male heights of 1905 mm, 1775 mm, and 1640 mm. For example, for a male user of 1800 mm, an appropriate value is calculated and utilized by interpolating the joint lengths for male heights of 1905 mm and 1775 mm. For other keys, the joint length for the corresponding height section can be interpolated and used. The height of the user may be calculated using the difference between the highest position and the lowest position of the depth data in the initial posture.

In this way, the distance between each joint constituting the human body is obtained based on the anthropometric data. However, the present disclosure is not limited to those described above.

In an embodiment of the present disclosure, a distance probabilistic model is generated based on a distance between joints (e.g., a distance between fixed joints based on anthropometric data) and an expected position, and the joints are estimated based on a point having the highest probability. For this reason, the joint positions of the elbow, wrist, knee, and ankle are corrected, and the fingertip joint and toe joint with the most noise are estimated using the surrounding points of the parent joint.

For joint estimation of arms and legs, a probability value is calculated as the square value of the distance from the joints of the body, arms, and legs of joint information obtained from a multi-sensor to the sample points. Specifically, a sample point is selected from three-dimensional sampling points that are depth data for a user. For example, sample points may be selected from three-dimensional sampling points based on depth information obtained from a multi-sensor. Next, the joint position obtained from the selected sample points and joint information obtained from a multi-sensor is applied to the distance probability model to obtain a probability value. To this end, a probability value is calculated based on the distance between the previous joint position and the sample points, and a probability value is calculated based on the distance to the other joint position and the sample points. Here, the previous joint position represents the position estimated as the joint in the previous frame, and the other joint position represents the positions of other joints obtained from the joint information. For example, the previous joint position represents the shoulder joint position estimated as the shoulder joint by correcting the joint information in the previous frame, and the other joint position represents the positions of joints other than the shoulder joint among joint information.

Based on these probability values, a final probability value for the sample point is calculated. The final probability value may be calculated based on the following equation.

$$F(x)=P(x_i)-\Sigma P(x_k), (j \neq k) \qquad \text{Equation 1}$$

Here, F(x) represents the final probability value for a sample point x, P represents the joint probability value according to the square of the distance, $x_j$ represents the square of the distance between the previous joint position and the sample point, and $x_k$ represents the square of the distance between the other joint position and the sample point.

$P(x_j)$ is the joint probability value according to the square of the distance between the previous joint position and the sample point, and $P(x_k)$ is the joint probability value according to the square of the distance between the other joint position and the sample point.

The probability value from the previous joint position becomes positive (+) and the probability value from other joint positions is calculated as negative (−), and the point having the largest value among the final sums is selected.

Figure 9:
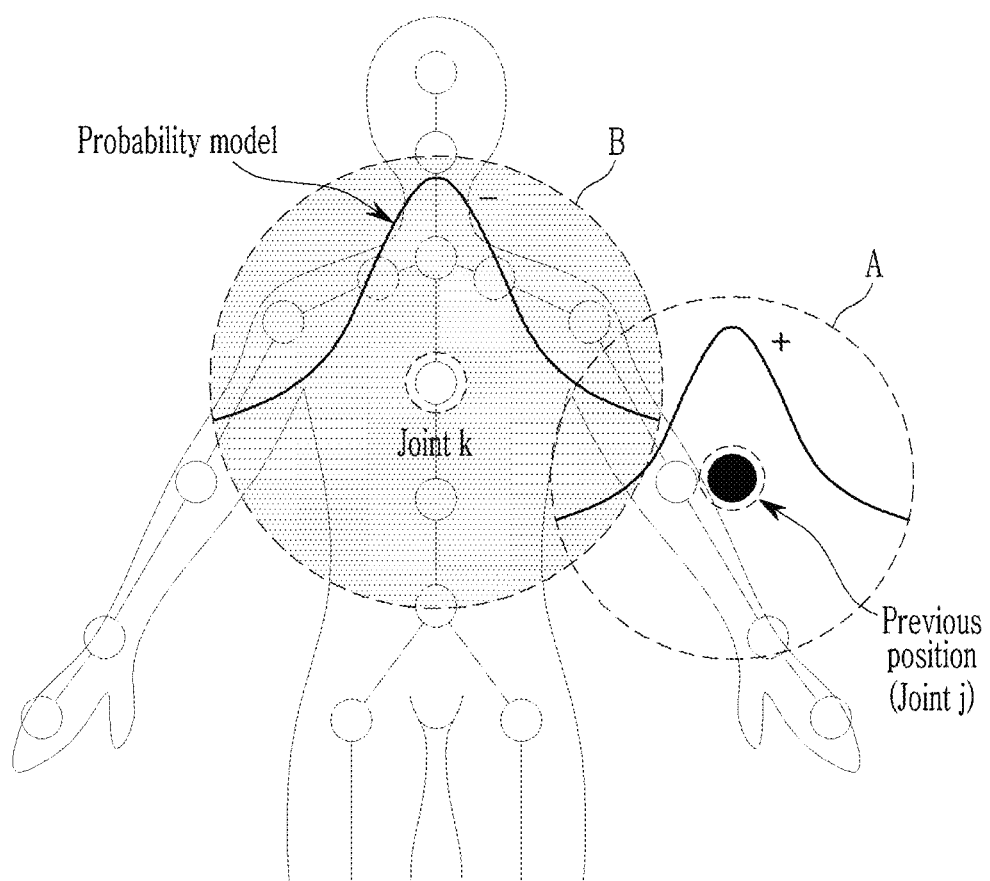
FIG. 9 is an exemplary diagram illustrating point selection by a distance probabilistic model according to an embodiment of the present disclosure.

FIG. 9 is an exemplary diagram illustrating point selection by a distance probabilistic model according to an embodiment of the present disclosure.

Based on the distance probabilistic model, probability values having a value centered on the previous joint position are shown as A in FIG. 9, and probability values having a negative value centered on the previous joint position are shown as B in FIG. 9.

Among the sample points having these probability values, that is, from among the final probability values for the sample points obtained based on Equation 1 above, the sample point having the largest final probability value is selected as the initial estimated position of the joint.

For example, if the final probability value of certain sample points appears as a shoulder joint, the sample point having the highest probability value among sample points having a high probability value of the shoulder joint is selected as the initial position of the shoulder joint, and then the selected sample point is selected as the initial position of the shoulder joint. Then, the surrounding points are searched based on the selected sample point and the average value of the searched surrounding points is taken and determined as the final shoulder joint position. This final joint position can be calculated based on the following equation.

$$p^i=\text{AVG}\{\text{Around}(x,\delta)\} \qquad \text{Equation 2}$$

Around( ) represents a point acquisition function within the δ range around the sampling point (x), and AVG { } represents an average value calculation function for a set of points.

In this case, the final joint position obtained based on Equation 2 may be determined as a position obtained by calculating a vector between the parent joint and the estimated average position ($p^i$), converting it into a normal vector, and then multiplying the joint length by the normal vector.

For example, since the sample point having the largest final probability value among the final probability values calculated for each sample point based on the previous joint position estimated as the shoulder joint and the other joint positions may be the shoulder joint, the corresponding sample point is selected, surrounding points around the selected sample point are searched, an average value of the searched surrounding points is obtained, and a point corresponding to the average value is finally used as a joint position corresponding to the shoulder joint. Then, the vector is calculated through the point corresponding to the average value and the position of the parent joint and converted into a normal vector, and the value obtained by multiplying the joint length by the normal vector converted in the parent joint is used as the final joint position. For example, the equation of final joint position=parent joint position (average position−parent joint position)·normal( )×joint length is applied. This is to prevent the joint length from changing.

Through this process, the final joint position for each joint is obtained by correcting the joint information obtained from a multi-sensor. Here, corrections are made for joints other than the fingertip joint and toe joint, and the fingertip joint and toe joint may be corrected as follows.

The fingertip joint and the toe joint are set as weighted average values of distance and angle for depth data in the area in the elbow-wrist vector and the knee-ankle vector directions, respectively.

The final joint positions for the fingertip joint and the toe joint may be calculated based on Equation 3 below.

$$v=s-p^i$$

$$d=\text{length}(v)$$

$$a=\text{normal}(v) \cdot v_p$$

$$p^e=\text{AVG}(s,w), w=d \times a \times a \qquad \text{Equation 3}$$

v represents the vector between the sample point s and the parent joint ($p^i$, wrist/ankle), d represents the distance of the vector, a represents the angle (cos value) of the vector, and $v_p$ represents the normal vector between the upper joints (e.g., a vector between knee and ankle, a vector between elbow and wrist), AVG(s, w) represents the average value calculation function by a sample point s and a weight value w, and $p^e$ represents the final end joint position (for example it represents the final joint position of the fingertip joint/the final joint position of the toe joint).

In the case of the fingertip joint and the toe joint, the distance (d) and angle (a) are obtained based on the above Equation 3 for the surrounding points, i.e., the sample points in the area in the direction of the elbow-wrist vector and the knee-ankle vector, and the weight w is obtained by multiplying the distance (d) and angle (a). Then, the average value of the weights obtained by the sample points is obtained and the average value is determined as the final joint position of the final end joint position, that is, the final joint position of the fingertip joint or the final joint position of the toe joint.

The user's posture is estimated based on joint data (final joint position) obtained through joint correction and estimation as described above.

Figure 10:
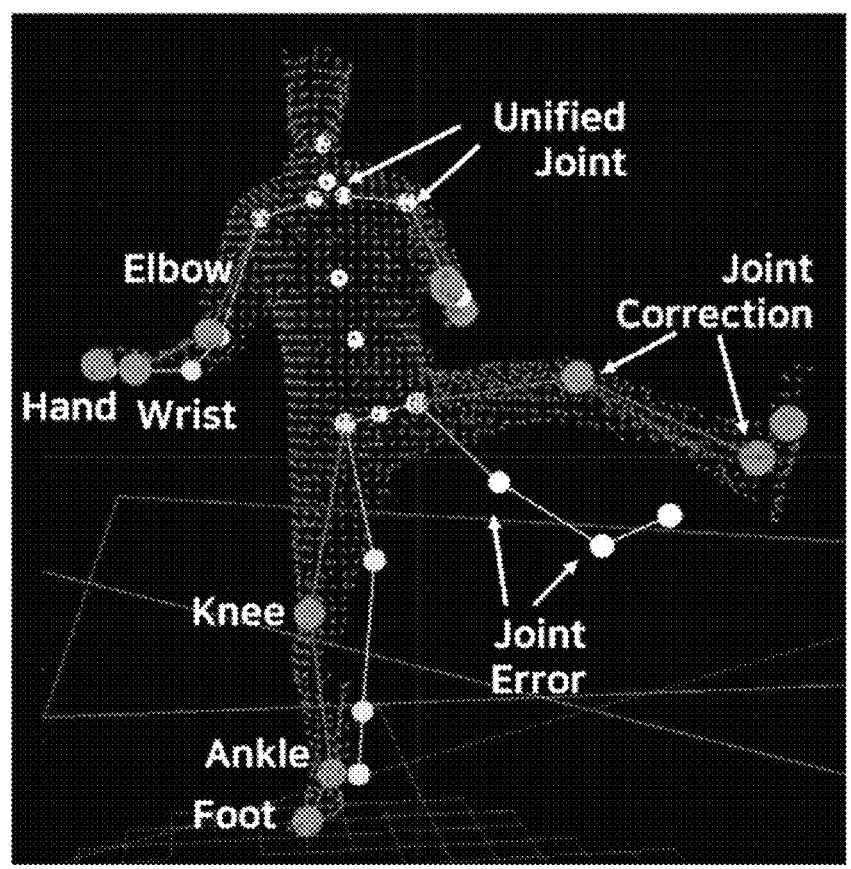
FIG. 10 is an exemplary diagram illustrating a posture estimation result according to an embodiment of the present disclosure.

FIG. 10 is an exemplary diagram illustrating a posture estimation result according to an embodiment of the present disclosure.

When posture estimation is made without correction for joint information obtained from a multi-sensor, as illustrated in FIG. 10, non-joint points (joint error) are estimated as joints. However, as described above, joint correction is performed on joint information and accurate posture estimation can be made based on joint correction obtained according to the joint correction.

Meanwhile, the tool posture estimation unit 50 is configured to estimate the posture of the training tool, and specifically, estimates the posture of the training tool using depth information and IR data.

IR markers are used to recognize the posture of the tools required for virtual training. As illustrated in FIG. 4, a plurality of IR markers are attached to the training tool, and a three-dimensional position of the training tool is estimated based on IR data obtained from a multi-sensor. Conventionally, a three-dimensional position is estimated using triangulation based on IR data obtained using two or more IR sensors. In this case, if the occlusion occurs on either side, the three-dimensional position cannot be obtained. In an embodiment of the present disclosure, a 3D position of an IR marker is estimated through a mapping relationship between depth data and IR data. Accordingly, three-dimensional position estimation is possible even using a single IR sensor.

Figure 11:
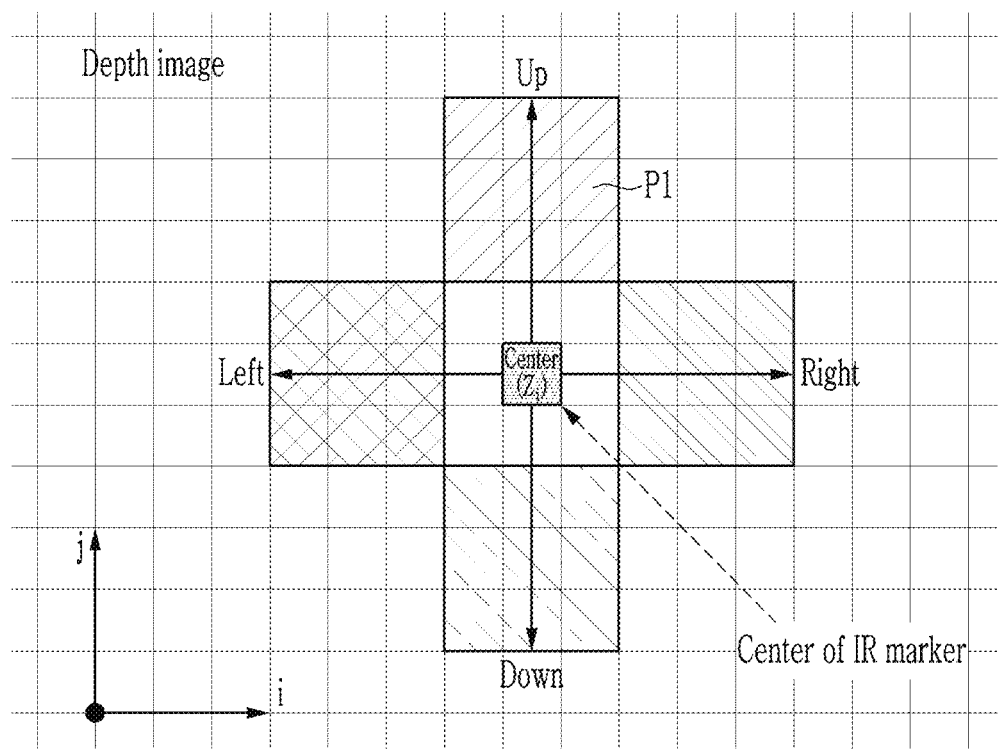
FIG. 11 is an exemplary diagram illustrating a depth data-based IR data tracking process according to an embodiment of the present disclosure.

FIG. 11 is an exemplary diagram illustrating a depth data-based IR data tracking process according to an embodiment of the present disclosure.

Only the part corresponding to the IR marker is extracted from the IR data, that is, in the IR image obtained by the IR sensor. Using the feature in which the data corresponding to the IR marker does not appear in the depth information of the image obtained by the camera, the pixel center point of the depth information obtained by the camera coincides with the pixel center point of the IR data obtained by the IR sensor. In this state, as in FIG. 11, the pixels having depth data in the up, down, left, and right directions in the depth information based on the pixel center point (IR marker center) of the IR data are extracted. The surrounding pixels extracted based on the pixel center point of the IR data may be calculated according to the following equation.

Current pixel ID=$C_y$×Image_width+$C_x$ $Up_{pixel}$=ID−Image_width*neighbor(1 pixel each left and right−3 pixels search in total)

$Left_{pixel}$=ID−neighbor(1 pixel each up and down−3 pixels search in total)

$Right_{pixel}$=ID+neighbor(1 pixel each up and down−3 pixels search in total)

$Down_{pixel}$=ID+Image_width*neighbor(1 pixel each left and right−3 pixels search in total)   Equation 4

Here, $C_y$ and $C_x$ represent coordinates of a reference pixel (e.g., a pixel center point of IR data), and Image_width represents the width of a pixel.

Neighbor represents pixels searched in a predetermined direction based on the coordinates of a reference pixel. For example, in the case of "$Up_{pixel}$", "neighbor (1 pixel each left and right−3 pixels search in total)" represents searching three pixels in the up direction from a reference pixel (e.g., "center($z_{ij}$)" in FIG. 11), one pixel on the left side of the reference pixel, and one pixel on the right side of the reference pixel, respectively. Accordingly, as shown in FIG. 11, pixels having a plurality of pieces of depth data and depicted by P1 are extracted. In this way, pixels having depth data in each of the up, down, left, and right directions of the reference pixel are extracted.

When the number of extracted pixels becomes K preset, the extracted pixels are converted into 3D positions. Here, the transformation into a three-dimensional position may be performed according to the following equation.

$Zi$=Depth$_{wh}$ $Xi$=(principal_point_x−w)/focal_length_x*$Zi$ $Yi$=(principal_point_y−h)/focal_length_y*$Zi$   Equation 5 w represents the pixel position in the x-axis direction in the image, and h represents the pixel position in the y-axis direction in the image. Depth$_{wh}$ represents depth information of a corresponding pixel, principal_point_x and principal_point_y represent a principal point where an optical axis meets an image plane, and focal_length_x and focal_length_y represent focal lengths.

3D positions $\{\{X_1, Y_1, Z_1\}, \ldots, \{X_k, Y_k, Z_k\}\}$ are obtained, and the average value of these 3D positions is finally used as the 3D position of the IR marker, that is, the 3D marker position.

Figure 12:
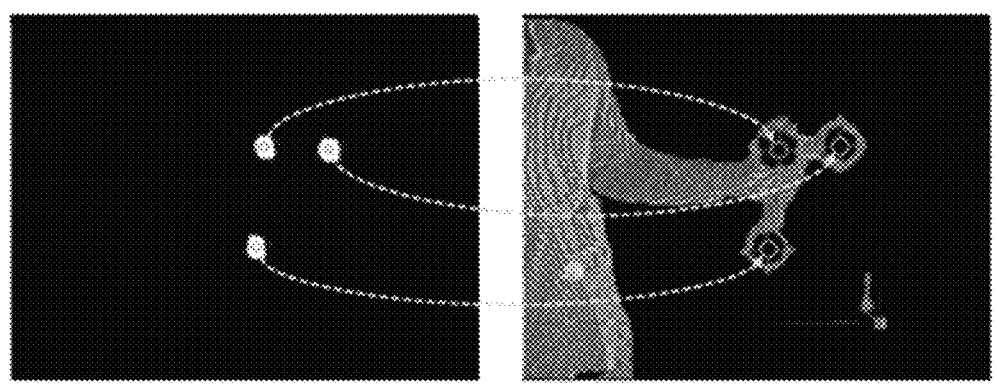
FIG. 12 is an exemplary diagram illustrating a three-dimensional (3D) position tracking result of an IR marker according to an embodiment of the present disclosure.
Figure 12:
Figure 12:
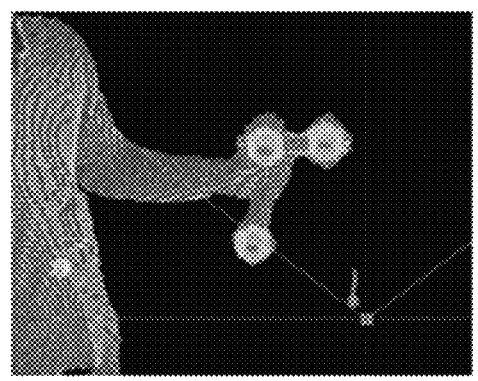

FIG. 12 is an exemplary diagram illustrating a 3D position tracking result of an IR marker according to an embodiment of the present disclosure.

For a pixel of an IR marker obtained from IR data as illustrated in (a) of FIG. 12, the matching of the position of the pixel and the depth information followed by the surrounding pixel search in a plurality of directions based on the matching are performed ((b) of FIG. 12), a position having an average value obtained based on the searched neighboring pixels is converted into a 3D position, and a 3D marker position is obtained based on the average value of the converted positions ((c) of FIG. 12).

The tool posture estimation unit 50 estimates the 3D position of the IR marker through the mapping relationship between the depth information and the IR data as described above, and estimates the posture of the training tool based on the estimated 3D position of the IR marker.

On the other hand, the user training evaluation unit 70 is configured to evaluate the training performance through the user posture and the tool posture. Using the user posture estimation result provided from the user posture estimation unit 30, the training tool posture estimation result provided from the tool posture estimation unit 40, and sensor data by a multi-sensor (e.g., a pressure sensor, a button sensor, etc.) provided from the data acquisition unit 10, it is possible to evaluate how the virtual training was performed.

FIG. 13A, FIG. 13B, and FIG. 14A to FIG. 14C are exemplary views illustrating training evaluation according to an embodiment of the present disclosure.

For example, in the case of virtual steam car washing training, it is possible to check whether steam is sprayed evenly and well on the vehicle based on the injection position, injection distance, and injection direction of the steam gun.

Figure 13A:
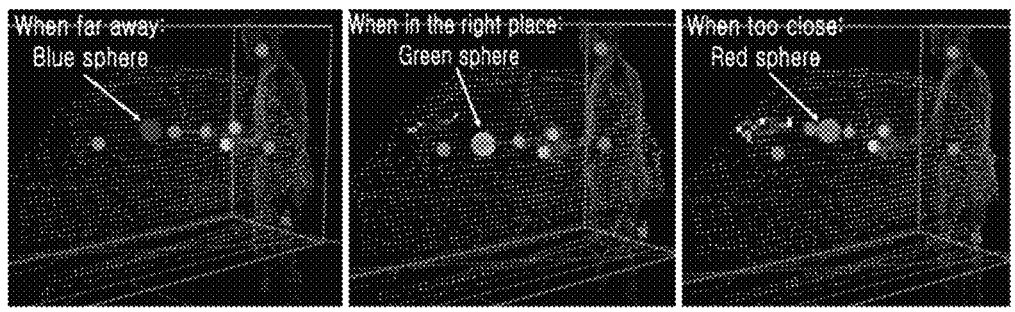
FIG. 13A, FIG. 13B, and FIG. 14A to FIG. 14C are exemplary diagrams illustrating training evaluation according to an embodiment of the present disclosure.

After the training evaluation, as in FIG. 13A, the training evaluation result may be displayed on the virtual content. For example, a sphere having a different color may be displayed according to the degree to which the spraying position of the steam gun is separated from the vehicle, so that the user can check the state in which the steam gun is operated.

Figure 13B:
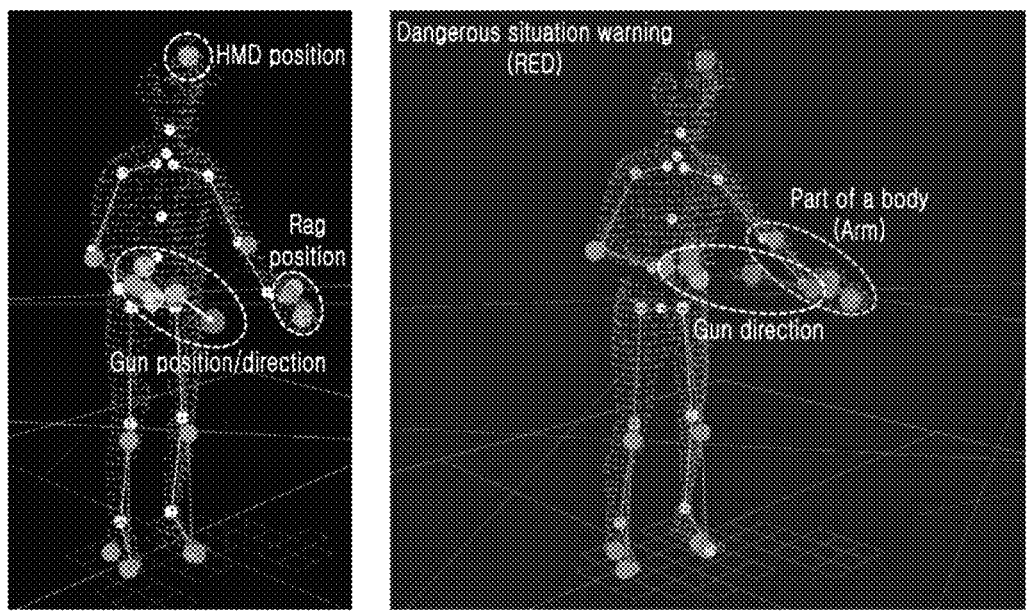

In addition, as in FIG. 13B, based on the injection position and injection direction of the steam gun, it is evaluated that the injection is made well over the vehicle to be trained. Also, for the safety of the trainee, it may judge whether the injection of the steam gun is directed toward the trainee's body or other people around it, and warning of a dangerous situation is selectively performed according to the judgement result.

Figure 14A:
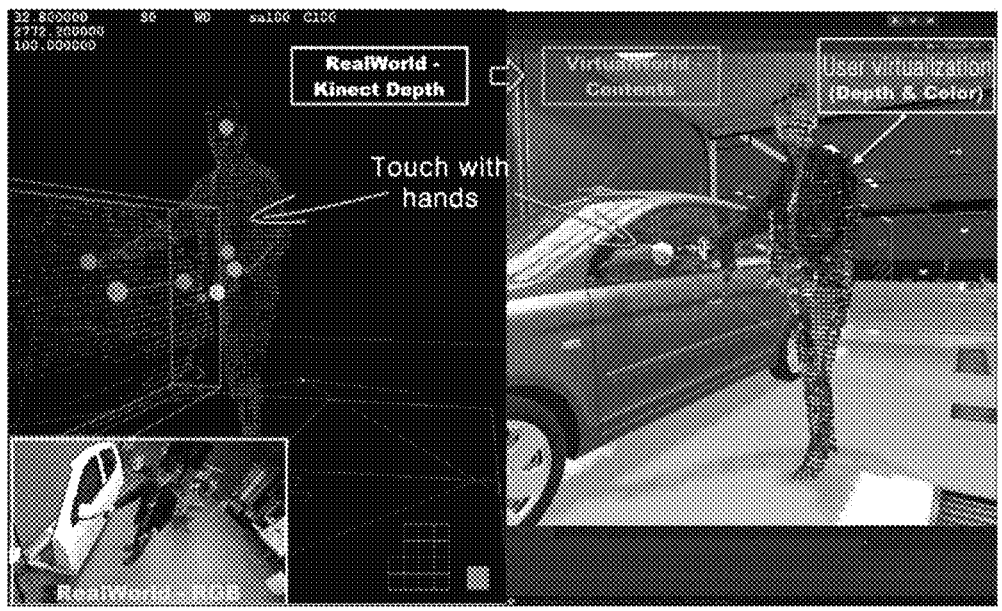
Figure 14B:
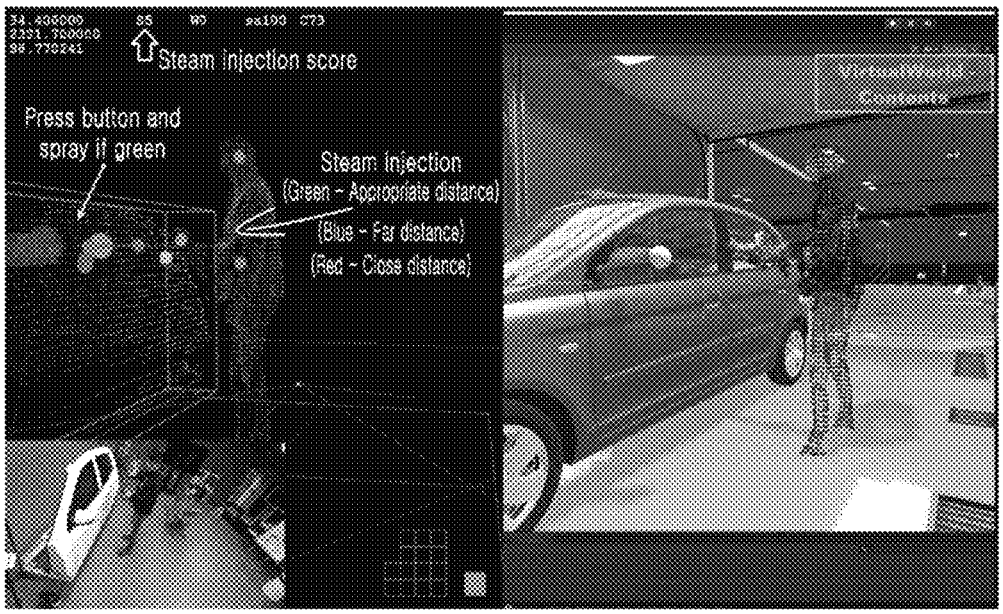

In addition, as illustrated in FIG. 14A based on the user posture estimation result, it is displayed whether the training is performed while the trainee properly touches the vehicle to be trained. Further, the steam injection score according to the steam injection of the trainee's steam gun is displayed as shown in FIG. 14B while the injection timing may be displayed in a separate color (e.g., green) to ensure proper steam injection.

Figure 14C:
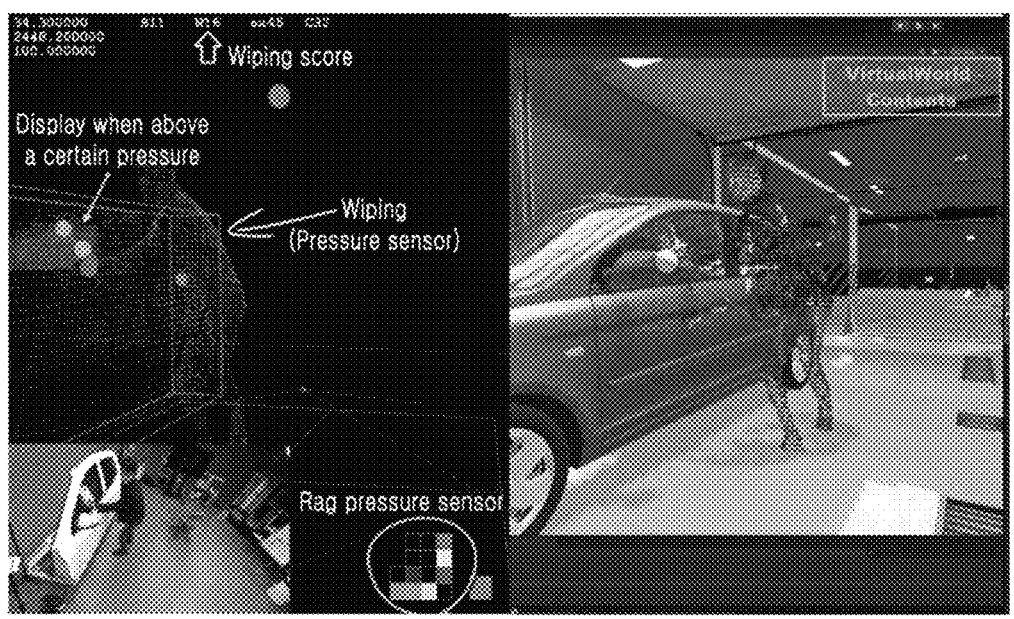

In addition, through the position and pressure value of the rag, it is evaluated whether it is cleaned evenly with an appropriate force, the score for the wiping with the rag is displayed as shown in FIG. 14C, or a specific color may be displayed when appropriate washing is performed over a certain pressure. Therefore, the trainee can recognize how clean the car is washing while performing virtual steam car washing training.

Next, a virtual training method according to an embodiment of the present disclosure will be described based on the device having such a structure.

Figure 15:
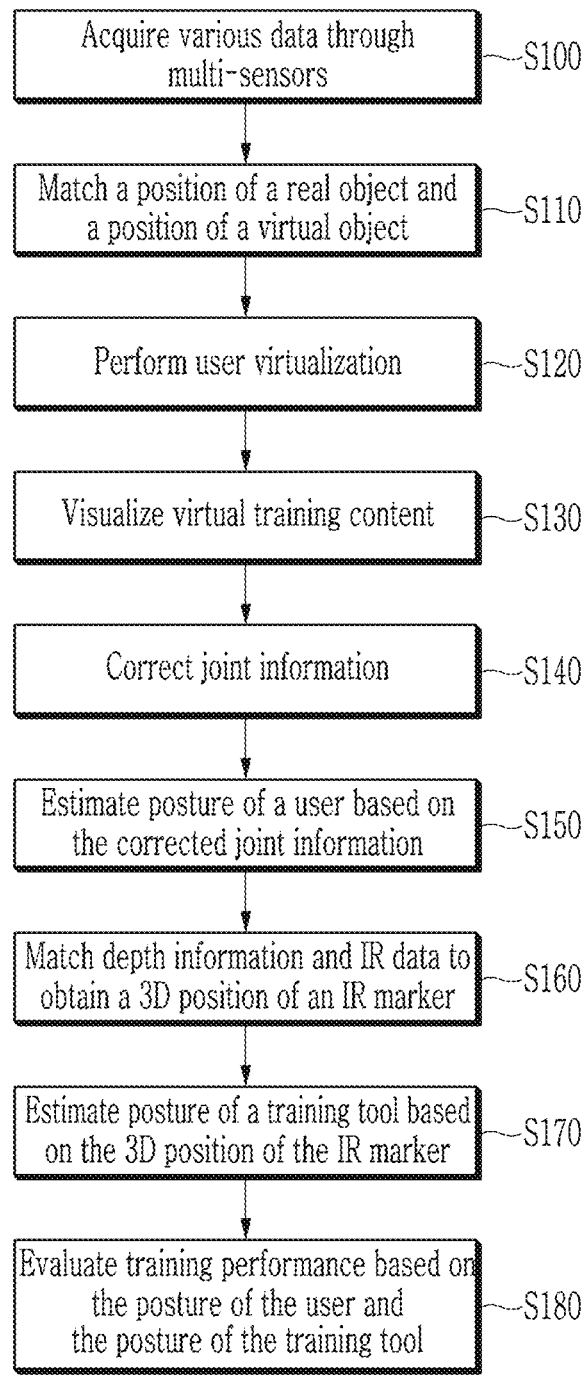
FIG. 15 is a flowchart of a virtual training method according to an embodiment of the present disclosure.

FIG. 15 is a flowchart of a virtual training method according to an embodiment of the present disclosure.

As shown in FIG. 15, the virtual training apparatus 1 acquires various data for virtual training through a multi-sensor (S100). The various data includes a depth image, a color image, IR data, pressure data of a pressure sensor, button operation data of a button sensor, and the like.

Thereafter, the 3D position of the real object is obtained based on the obtained depth image, color image, and IR data of the real object, and the obtained 3D position of the real object and the position of the virtual object (e.g., a virtual car model) applied to the virtual environment are matched (S110).

Then, the depth is extracted from the depth information on the user image, and user virtualization is performed by matching the extracted depth data and color information (S120). According to this user virtualization, the color data and depth data of the user image are obtained.

The depth data and color data for the user are visualized in the virtual training content (S130). Here, visualization may be performed based on sampling points for the depth data and color data of the user image. For example, while virtual training content is provided through an HMD worn by the user, as illustrated in FIG. 7, the virtual object whose position is matched with the real object is visualized in a virtual space, and visualization of the user is performed. Through this visualization, the user can see the whole image of himself rather than a part of himself, and he conducts virtual training using training tools (a steam gun, a rag, etc.). At this time, as the virtual object is matched with the real object and visualized, when the user interacts with the virtual object, the user touches the real object, thereby obtaining a sense of reality.

In addition, the virtual training apparatus 1 estimates the user's posture using joint information, depth information, and depth data for the user. To do this, correction on the joint information is performed (S140) and the user's posture is estimated using the corrected joint information (S150). For the process of performing correction on joint information, refer to the description described above, and detailed description thereof will be omitted herein.

In addition, the virtual training apparatus 1 estimates the posture of the training tool using depth information and IR data. To this end, after matching their center points by matching the depth information and the IR data, the surrounding pixels are extracted from the depth information based on the center point of the IR data, and the 3D position of the IR marker attached to the tool is obtained based on the positions of the extracted pixels (S160). Then, the posture of the training tool is estimated based on the three-dimensional position of the IR marker (S170). For the 3D position acquisition and tool posture estimation of the IR marker, refer to the description described above, and a detailed description thereof will be omitted.

Next, the virtual training apparatus 1 evaluates the performance of the virtual training based on the user posture estimation result, the tool posture estimation result, and sensor data by a multi-sensor (e.g., a pressure sensor, a button sensor, etc.) (S180). For example, the force applied to the rag is estimated based on the pressure data, the steam gun injection timing is confirmed based on the button operation data, and it is possible to evaluate the performance of the virtual steam car wash training based on the estimated force and injection timing, and the estimated user posture and the estimated training tool posture.

Figure 16:
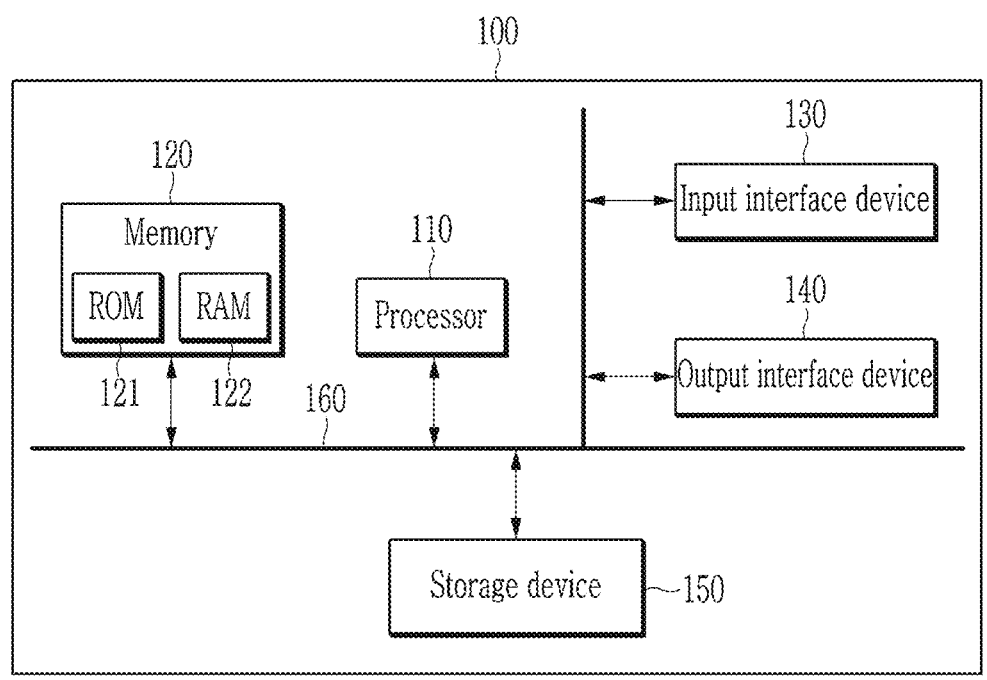
FIG. 16 is a structural diagram illustrating a computing device for implementing a virtual training method according to an embodiment of the present disclosure.

FIG. 16 is a structural diagram illustrating a computing device for implementing a virtual training method according to an embodiment of the present disclosure.

As shown in FIG. 16, the virtual training method according to an embodiment of the present disclosure may be implemented using a computing device 100.

The computing device 100 may include at least one of a processor 110, a memory 120, an input interface device 130, an output interface device 140, and a storage device 150. Each of the components may be connected by a bus 160 to communicate with each other. In addition, each of the components may be connected through a separate interface or a separate bus centering on the processor 110 instead of the common bus 160.

The processor 110 may be implemented as various types such as an application processor (AP), a central processing unit (CPU), a graphics processing unit (GPU), and the like, and may be any semiconductor device that executes an instruction stored in the memory 120 or the storage device 150. The processor 110 may execute a program command stored in at least one of the memory 120 and the storage device 150. The processor 110 may be configured to implement the functions and methods described with reference to FIG. 1 to 10 above. For example, the processor 110 may be configured to perform functions of an object matching processing unit, a user virtualization processing unit, a user posture estimation unit, a tool posture estimation unit, a virtual training content providing unit, and a training evaluation unit.

The memory 120 and the storage device 150 may include various types of volatile or non-volatile storage media. For example, the memory may include a read-only memory (ROM) 121 and a random access memory (RAM) 122. In an embodiment of the present disclosure, the memory 120 may be located inside or outside the processor 110, and the memory 120 may be connected to the processor 110 through various known means.

The input interface device 130 is configured to provide input data (e.g., various data obtained from a multi-sensor) to the processor 1100, and the output interface device 140 is configured to output data (e.g., contents for virtual training) from the processor 110.

The computing device 100 having such a structure is called a virtual training apparatus, and may implement a virtual training control method according to an embodiment of the present disclosure.

In addition, at least a part of the virtual training method according to an embodiment of the present disclosure may be implemented as a program or software executed in the computing device 100, and the program or software may be stored in a computer-readable medium.

In addition, at least a part of the virtual training method according to an embodiment of the present disclosure may be implemented as hardware capable of being electrically connected to the computing device 100.

According to embodiments, it is possible to provide a virtual training service capable of tangible interaction by matching a real object with a virtual object and recognizing a user and a training tool through various sensors.

In particular, by estimating the user's shape and posture based on data from a multi-sensor and tracking the tool posture/pressure required for virtual training, it is possible to give the effect of actual training in a virtual environment. At this time, by linking the real object and the virtual object in the virtual environment and virtualizing the appearance of the real user rather than the expression of the existing hand model, it is possible to increase the immersion and effect of training through tangible interaction.

In addition, it is possible to increase the realistic effect by virtualizing the user's full body shape in the part where only the virtual hand model was visualized in the existing virtual training/experience system.

In addition, in the prior art, additional sensors should be used to recognize various states (user posture, tool posture, virtualization, real-virtual matching, etc.), but according to embodiments of the present disclosure, using a multi-sensor (RGB, JOINT, DEPTH, IR, and pressure), various types of recognition are possible with a minimum number of of sensors. For example, conventional IR marker tracking requires at least two or more sensors in a stereo method, but in an embodiment of the present disclosure, three-dimensional position tracking by matching an IR image and a depth image may be provided even in one sensor. This makes it possible to track the posture of a tool that is strong against occlusion. Through this, it is possible to evaluate the training and to increase the effectiveness of the training.

According to this embodiment, a tangible interaction is provided through the user's whole body posture and tool posture.

The embodiments of the present disclosure are not implemented only through the apparatus and/or method described above, but may be implemented through a program for realizing a function corresponding to the configuration of the embodiment of the present disclosure, and a recording medium in which the program is recorded. This implementation can also be easily performed by expert person skilled in the technical field to which the present disclosure belongs from the description of the above-described embodiments.

The components described in the embodiment s may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the embodiment s may be implemented by software, and the software may be recorded on a recording medium. The components, functions, and processes described in the embodiment s may be implemented by a combination of hardware and software.

The method according to embodiment s may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages, and may be deployed in any form including a stand-alone program or a module, a component, a subroutine, or other units appropriate for use in a computing environment. A computer program may be deployed to be executed on one computer or on multiple computers at one site or distributed across multiple sites and interconnected by a communication network. Processors appropriate for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic disks, magneto-optical disks, or optical disks. Examples of information carriers appropriate for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk, and a read only memory (ROM), a random access memory (RAM), a flash memory, an erasable programmable ROM (EPROM), and an electrically erasable programmable ROM (EEPROM), and any other known computer readable medium. A processor and a memory may be supplemented by, or integrated with, a special purpose logic circuit. The processor may run an operating system (OS) and one or more software applications that run on the OS. The processor device also may access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific embodiment. Features described in the specification in the context of individual embodiment s may be implemented as a combination in a single embodiment. In contrast, various features described in the specification in the context of a single embodiment may be implemented in multiple embodiment s individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood that the operations needing to be performed in the specific order or in sequence to obtain desired results or as all the operations needing to be performed. In a specific case, multitasking and parallel processing may be advantageous. In addition, it should not be understood as requiring a separation of various apparatus components in the above-described embodiment s in all embodiment s, and it should be understood that the above-described program components and apparatuses may be incorporated into a single software product or may be packaged in multiple software products. It should be understood that the embodiment s disclosed herein are merely illustrative and are not intended to limit the scope of the disclosure. It will be apparent to one of ordinary skill in the art that various modifications of the embodiment s may be made without departing from the spirit and scope of the claims and their equivalents.

What is claimed is:

1. A method for virtual training, comprising:
   acquiring, by a training apparatus, data for virtual training, and acquiring a three-dimensional position of a real object based on a depth image and color image of the real object and infrared (IR) data included in the obtained data;
   matching, by the training apparatus, the three-dimensional position of the real object with a position of a virtual object to be applied to a virtual environment;
   performing, by the training apparatus, a virtualization of an overall appearance of a user by extracting a depth from depth information on a user image included in the obtained data and matching the extracted depth with the color information;
   visualizing, by the training apparatus, depth data and color data for the user obtained according to virtualization of the user in virtual training content;
   performing, by the training apparatus, correction on joint information using the joint information and the depth information included in the obtained data, and estimating a posture of the user using the corrected joint information; and
   estimating, by the training apparatus, a posture of a training tool using the depth information and IR data included in the obtained data;
   wherein the performing of correction on joint information comprises obtaining final joint positions by applying sample points selected from the depth data for the user obtained according to the virtualization of the user and joint positions obtained from the joint information to a distance probability model, and estimating the posture of the user using the obtained final joint positions, and
   wherein the applying the sample points to the distance probability model includes calculating a probability value based at least in part on a distance between a previous joint position and a sample point.

2. The method of claim 1, wherein
   the performing of correction on joint information comprises:
   selecting sample points selected from the depth data for the user obtained according to the virtualization of the user and obtaining a probability value by applying the sample points and joint positions obtained from the joint information to the distance probability model;
   selecting a sample point that satisfies a predetermined condition based on a probability value obtained for each sample point; and
   determining the final joint positions based on an average value of surrounding points of the sample point that satisfies the predetermined condition.

3. The method of claim 2, wherein
   the selecting of a sample point that satisfies a predetermined condition comprises:
   obtaining a final probability value for a sample point based on a probability value obtained based on a square of the distance between the previous joint position and the sample point and a probability value obtained based on a square of a distance between another joint position and the sample point; and
   selecting a sample point having a largest final probability value from among the final probability values obtained for each sample point.

4. The method of claim 2, wherein
   the determining of the final joint positions comprises
   obtaining an average value of surrounding points around the sample point satisfying the predetermined condition, determining a point having the average value as an initial position of a joint, converting a vector calculated through the initial position and a parent joint position into a normal vector, and determining a final joint position by multiplying the normal vector by a joint length.

5. The method of claim 1, wherein
   the performing of correction on joint information comprises,
   for a fingertip joint and a toe joint among joint information, selecting points in a setting area from among sample points selected from the depth data for the user obtained according to the virtualization of the user, obtaining weights based on a distance and an angle for the selected points, determining a final joint position for the fingertip joint or a final joint position for the toe joint based on the weights, and estimating the posture of the user using the determined final joint positions.

6. The method of claim 5, wherein
   the setting area is an area in a direction of an elbow-wrist vector and a direction of a knee-ankle vector, and
   in the estimating the posture of the user, an average value of the weights is determined as the final joint position for the fingertip joint or the final joint position for the toe joint.

7. The method of claim 1, wherein
the estimating of a posture of a training tool comprises
matching a center point of IR data obtained from an IR marker attached to the training tool with a center point of the depth information included in the obtained data, determining a position of the IR marker obtained by the IR data based on positions of pixels, which have depth data, extracted from the depth information based on the matched center point, and estimating the posture of the training tool based on the determined position of the IR marker.

8. The method of claim 7, wherein
the estimating of a posture of a training tool comprises:
matching the center point of the depth information included in the obtained data with the center point of the IR data obtained from the IR marker attached to the training tool;
extracting pixels having depth data in each direction above, below, left, and right from the depth information based on the matched center point;
converting the positions of the extracted pixels into three-dimensional positions;
determining a three-dimensional position of a pixel having an average value of the three-dimensional positions of the extracted pixels as a position of the IR marker; and
estimating the posture of the training tool based on the determined position of the IR marker.

9. The method of claim 8, wherein
the extracting of pixels having depth data in each direction comprises
searching for pixels having depth data in each direction up, down, left, and right from the depth information, and ending the searching when a number of searched pixels is a set number.

10. The method of claim 1, wherein
the virtual training is virtual steam car wash training, the real object is a car, the virtual object is a virtual car, the training tool includes a rag and a steam gun, and the obtained data include pressure data obtained from a pressure sensor inserted into the rag and button operation data obtained from a button sensor included in the steam gun.

11. The method of claim 10, further comprising:
after the estimating of a posture of a training tool,
estimating force applied to the rag based on the pressure data, confirming injection timing of the steam gun based on the button operation data, and evaluating performance of the virtual steam car wash training based on the estimated force, the injection timing, and the estimated user posture of the training tool.

12. An apparatus for virtual training, comprising:
an interface device configured to receive data for virtual training from a multi-sensor; and
a processor configured to provide virtual training content based on the data input through the interface device,
wherein the processor is configured to perform operations by:
acquiring, through the interface device, data for virtual training, and acquiring a three-dimensional position of a real object based on a depth image and color image of the real object and infrared (IR) data included in the obtained data;
matching the three-dimensional position of the real object with a position of a virtual object to be applied to a virtual environment;
performing virtualization of an overall appearance of a user by extracting a depth from depth information on a user image included in the obtained data and matching the extracted depth with the color information;
visualizing depth data and color data for the user obtained according to virtualization of the user in virtual training content;
performing correction on joint information using the joint information and the depth information included in the obtained data, and estimating a posture of the user using the corrected joint information; and
estimating a posture of a training tool using the depth information and IR data included in the obtained data;
wherein the performing of correction on joint information comprises obtaining final joint positions by applying sample points selected from the depth data for the user obtained according to the virtualization of the user and joint positions obtained from the joint information to a distance probability model, and estimating the posture of the user using the obtained final joint positions, and
wherein the applying the sample points to the distance probability model includes calculating a probability value based at least in part on a distance between a previous joint position and a sample point.

13. The apparatus of claim 12, wherein
when performing the operation of correction based on joint information, the processor is configured to perform operations by:
selecting a sample point that satisfies a predetermined condition based on a probability value obtained for each sample point; and
determining the final joint positions based on an average value of surrounding points of the sample point that satisfies the predetermined condition.

14. The apparatus of claim 13, wherein
when performing the operation of selecting a sample point that satisfies a predetermined condition, the processor is configured to perform operations by:
obtaining a final probability value for a sample point based on a probability value obtained based on a square of a distance between a previous joint position and the sample point and a probability value obtained based on a square of a distance between another joint position and the sample point; and
selecting a sample point having a largest final probability value from among the final probability values obtained for each sample point.

15. The apparatus of claim 13, wherein
when performing the operation of determining the final joint positions, the processor is configured to perform an operation by
obtaining an average value of surrounding points around the sample point satisfying the predetermined condition, determining a point having the average value as an initial position of a joint, converting a vector calculated through the initial position and a parent joint position into a normal vector, and determining a final joint position by multiplying the normal vector by a joint length.

16. The apparatus of claim 13, wherein
when performing the operation of correction based on joint information, the processor is configured to perform an operation by,
for a fingertip joint and a toe joint among joint information, selecting points in a setting area from among sample points selected from the depth data for the user obtained according to the virtualization of the user, obtaining weights based on a distance and an angle for the selected points, determining a final joint position for the fingertip joint or a final joint position for the toe joint based on the weights, and estimating the posture of the user using the determined final joint positions.

17. The apparatus of claim 12, wherein when performing the operation of estimating a posture of a training tool, the processor is configured to perform an operation by, for a training tool with a center point of the depth information included in the obtained data, determining a position of an IR marker attached to the training tool obtained by the IR data based on positions of pixels, which have depth data, extracted from the depth information based on a matched center point, and estimating the posture of the training tool based on the determined position of the IR marker.

18. The apparatus of claim 17, wherein when performing the operation of estimating a posture of a training tool, the processor is configured to perform operations by:

matching the center point of the depth information included in the obtained data with a center point of the IR data obtained from the IR marker attached to the training tool;

extracting pixels having depth data in each direction above, below, left, and right from the depth information based on the matched center point;

converting the positions of the extracted pixels into three-dimensional positions;

determining a three-dimensional position of a pixel having an average value of the three-dimensional positions of the extracted pixels as the position of the IR marker; and estimating the posture of the training tool based on the determined position of the IR marker.

19. The apparatus of claim 12, wherein the virtual training is virtual steam car wash training, the real object is a car, the virtual object is a virtual car, the training tool includes a rag and a steam gun, and the obtained data includes pressure data obtained from a pressure sensor inserted into the rag and button operation data obtained from a button sensor included in the steam gun, wherein after performing the operation of estimating a posture of a training tool, the processor is further configured to perform an operation by estimating force applied to the rag based on the pressure data, confirming injection timing of the steam gun based on the button operation data, and evaluating performance of the virtual steam car wash training based on the estimated force, the injection timing, and the estimated user posture of the training tool.

* * * * *